Patented June 1, 1943

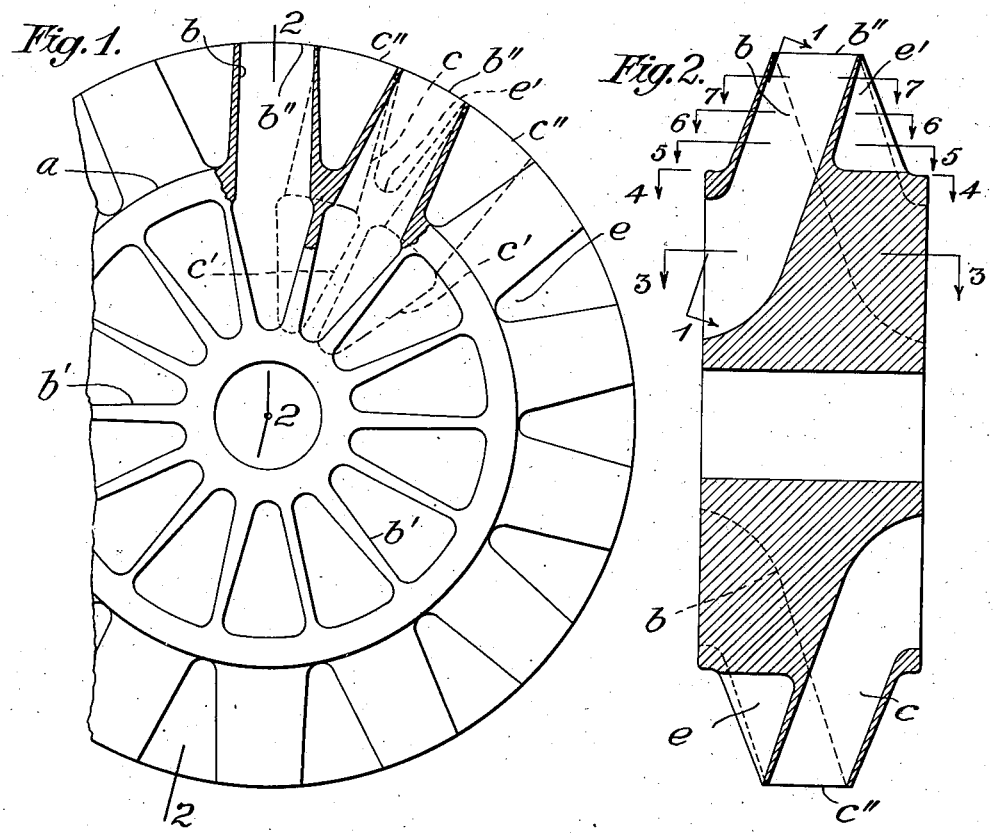

2,320,663

UNITED STATES PATENT OFFICE 2,320,663

CENTRIFUGAL IMPELLER

Erich Schultz, Stuttgart-Rotenberg, Germany; vested in the Alien Property Custodian Application May 28, 1940, Serial No. 337,617
In Germany June 6, 1939

7 Claims. (Cl. 103—115)

The invention refers to an improvement of centrifugal impellers for centrifugal pumps, turbo blowers or the like, namely such impellers as comprise a wheel having channels which lead from both of the side faces of the wheel into the body thereof. These channels extend radially through the body of the wheel to its periphery. By means of these channels the fluid can flow through the wheel from the side faces thereof to the periphery and out of the wheel or from the periphery to the side faces and out of the rotor wheel.

An object of the invention is to provide an impeller in which the fluid passed therethrough is maintained substantially free of eddies and in which there is an exceptionally eddy-free and uniform discharge of the fluid from the exit-cross-sections of the rotor wheel. Another object is to provide a wheel having a high efficiency.

Furthermore, the invention aims at a most favorable spatial arrangement of the channels leading from both side faces of the wheel in substantially radial directions outwardly towards the periphery. By this arrangement the channels of both channel rows may emerge from the wheel periphery in substantially the same cross sectional plane, the exit or discharge openings of both channel rows, at the periphery, following each other alternately while the inlet openings of each channel row may be located next to each other in a side face of the wheel, for instance, in a circle around the axle of the rotor wheel.

Each channel in the different rows is positioned so that its end near the rotor axis is displaced with respect to the center of such axis. The channels in the different rows extend alongside each other in their passage through the wheel and adjacent channels progressively overlap each other as they approach the periphery of the wheel at which location the various channels are centrally disposed between the sides of the wheel.

The invention also refers to a form of cross section of the channels which is specially suitable and, by means of which the gradual interspacing of the channel cross sections is facilitated, at the same time a uniform thickness of the channel walls being made possible.

In contrast with well known rotor wheels, according to the present invention, a comparatively small number of channels may be employed to attain a uniform continuous flow of the medium passed through the rotor wheel, to the end of simplifying the construction and decreasing the weight of the wheel.

Other objects will appear from the following description of an illustrative embodiment of the invention taken together with the attached drawing wherein:

Fig. 1 shows a side view of the rotor wheel in which the channels of the one side of the wheel are partly illustrated in a longitudinal section through the line 1—1 of the Fig. 2.

Fig. 2 shows a section through the rotor wheel according to the line 2—2—2 of Fig. 1.

The Figs. 3 to 7 show sections through part of the rotor wheel corresponding to the lines indicated by numbers in Fig. 2, and Fig. 8 shows a facial view onto part of the rotor wheel.

The rotor wheel $a$ is shaped in such manner that it has a suction effect on both sides. Channels $b$ and $c$ extend through the body of the wheel and have inlet openings $b'$ and $c'$ respectively in the opposite side faces of the wheel at locations adjacent to the wheel hub. These channels extend in generally radial direction through the body of the wheel to the periphery thereof where they emerge from the body as indicated by openings $b''$ and $c''$ in the periphery. As the channels $b$ and $c$ extend radially of the wheel, by staggering the location of the inlet openings $b'$ relative to the openings $c'$, the channels beginning in one side of the wheel can move gradually into the clearings between the channels in the other side of the wheel so that the openings $b''$ and $c''$ of the channels $b$ and $c$ in the periphery are alternately positioned around the circumference of the wheel.

As may be noted from the drawing, the channels $b$ and $c$ near the openings $b'$ and $c'$ are axially displaced with respect to the center of the axis of rotation of the wheel and also to each other but at their openings $b''$ and $c''$ in the periphery of the impeller they are centrally disposed between the sides of the wheel and are in overlapped relation to each other. Such construction is made possible by forming the channels $b$ and $c$ with a trapezoidal cross section, this expedient also providing channels of substantially uniform cross section having dividing walls of minimum and substantially uniform thickness.

The overlapping of the channels $b$ and $c$ increases progressively from their openings $b'$ and $c'$ to the periphery of the impeller as is particularly well shown in Figs. 3–8 of the drawing. In Fig. 3 the overlap has not begun while in Fig. 4 it is just beginning. Figs. 5, 6 and 7, respectively, show the overlap about one-half, three-quarters and seven-eighths completed, while in Fig. 8 the full overlap is disclosed. The trapezoidal passages, as they increasingly overlap, are spread apart so that their spacing increases as the periphery is approached. This takes care of the fact that the circumference of the impeller increases with increase in radius.

As shown in Figs. 3-7 the more pointed shaped trapezoidal cross section of the channels b, c changes to a comparatively blunt trapezoidal form at the wheel circumference. However, the cross section of the channels and the thickness of the walls between adjacent channels are substantially uniform, especially at the portion of the channels near the wheel circumference. Thus, channels b, c are only slightly separated at the wheel circumference as indicated at d in Fig. 8 and follow each other almost without interruption to afford a continuous and smooth flowing discharge. At the same time there is substantially prevented any injurious accumulation of material near the wheel circumference which, at high rotational speeds, might lead to excessive centrifugal force.

The opposite faces of the wheel a are provided with recesses e and e', each recess in each side face of the impeller being located axially opposite to a fluid channel beginning in the other side face of the impeller. Thus, each recess e is opposite to a channel c and each recess e' is opposite to a channel b. The recesses e and e' keep down the weight of the wheel near its circumference and also aid in preventing the back-flow of fluid into the crevice between the outside of the rotor wheel and the inside of the casing wall (which is not shown in the drawing).

Having now particularly described and ascertained the nature of my invention, and in what manner the same is to be performed, I declare that what I claim is:

1. A centrifugal impeller formed with a first set of passages starting inward generally axially from one end face thereof and having a second set of passages starting inward generally axially from the other end face thereof, both sets curving gradually to generally radial directions and extending outwardly terminating in a single series of peripheral openings comprising openings of said first set interspersed with openings of said second set, said passages having a trapezoidal cross-section, the wider walls of the passages being on the outside thereof and the narrower walls on the inside thereof.

2. A centrifugal impeller according to claim 1, provided with recesses in its end walls, each recess being in registry with a passage entering on the opposite face of the impeller and being separated therefrom by a wall of substantially minimum thickness.

3. A centrifugal impeller according to claim 1, in which the axial openings of the first set of passages (seen in axial direction) intersect alternately with those of the other set of passages, while the peripheral openings of the first set each alternate with the peripheral openings of the other set in a circumferential direction, the said openings being closely adjacent.

4. A centrifugal impeller comprising a one-piece hub member composed of a substantially cylindrical hub section and of a peripheral annulus integral therewith, said hub section having a first set of passages starting inward generally axially from one end face thereof and having a second set of passages starting inward generally axially from the other end face thereof, both sets curving gradually to generally radial directions and extending into said annulus terminating in a single series of peripheral openings, said passages having a trapezoidal cross-section, the wider walls of the passages being on the outside thereof and the narrower walls on the inside thereof, the two sets of passages traversing said annulus being inclined to one another and the annulus being provided with recesses in its end walls, each recess being in registry with an opposite passage and being separated therefrom by a wall of substantially minimum thickness.

5. A centrifugal impeller formed with a first set of passages starting inward generally axially from one end face thereof and having a second set of passages starting inward generally axially from the other end face thereof, both sets curving gradually to generally radial directions and extending outwardly terminating in a single series of peripheral openings comprising openings of said first set interspersed with openings of said second set, said passages having a wedge-shaped cross-section, the wider walls of the passages being on the outside thereof so that the passages are narrower on the side thereof away from that face thereof in which the respective passages begin, whereby the walls between adjacent ones of said passages may be made of minimum thickness.

6. A centrifugal impeller formed with a first set of passages starting inward generally axially from one end face thereof and having a second set of passages starting inward generally axially from the other end face thereof, both sets curving gradually to generally radial directions outwardly terminating in a single series of peripheral openings comprising openings of said first set interspersed with openings of said second set, said impeller being formed with recesses adjacent its periphery, each recess being in registry with a passage entering on the opposite face of the impeller and being separated therefrom by a wall of a substantially uniform thickness.

7. A centrifugal impeller formed with a first set of passages starting inward generally axially from one end face thereof and having a second set of passages starting inward generally axially from the other end face thereto, both sets curving gradually to generally radial directions and extending outwardly terminating in a single series of peripheral openings comprising openings of said first set interspersed with openings of said second set, said passages having a trapezoidally shaped cross section, the cross section of the passages being substantially uniform throughout their length and the walls between adjacent passages being of substantially uniform thickness through at least that part of their length in which said passages are interspersed.

ERICH SCHULTZ.